United States Patent Office 3,201,111
Patented Aug. 17, 1965

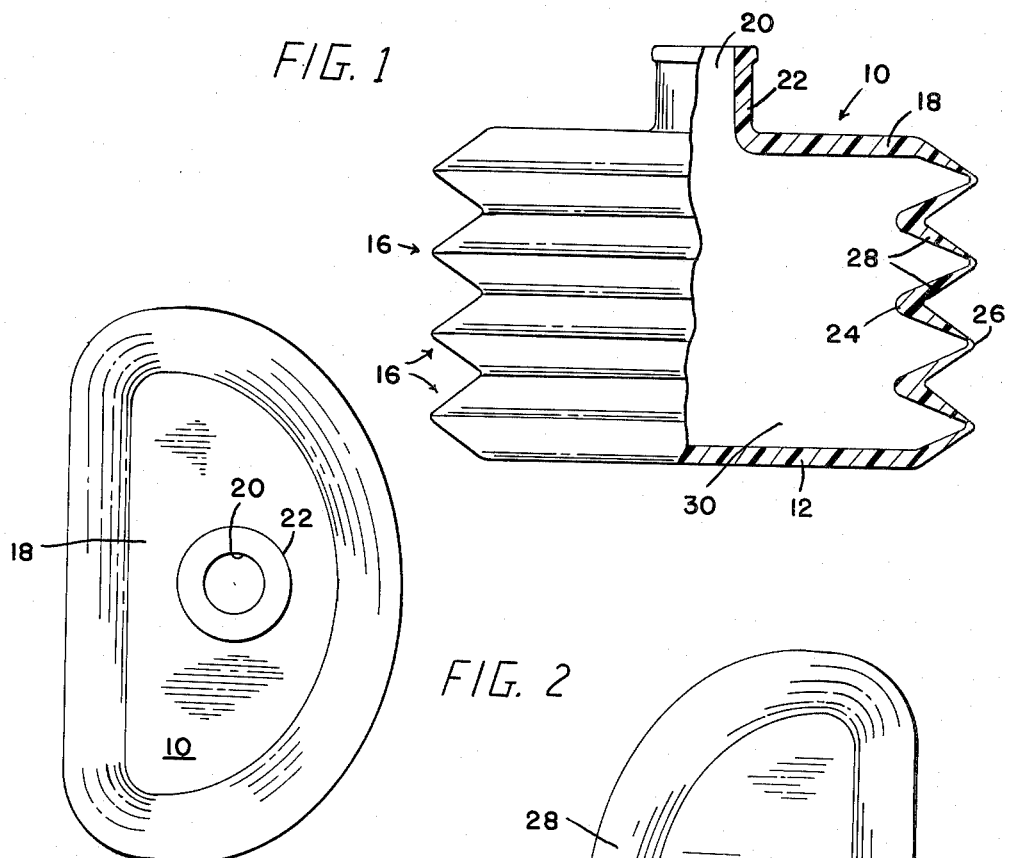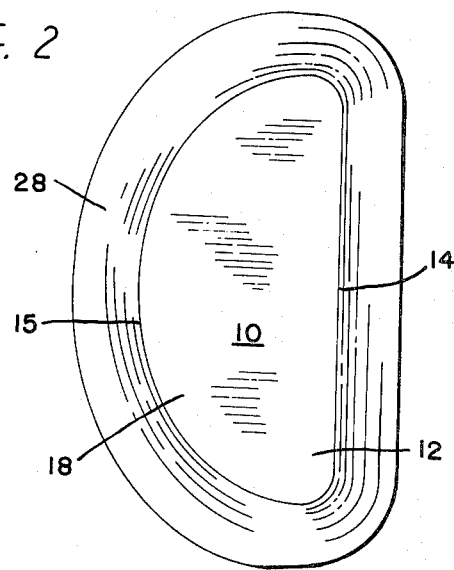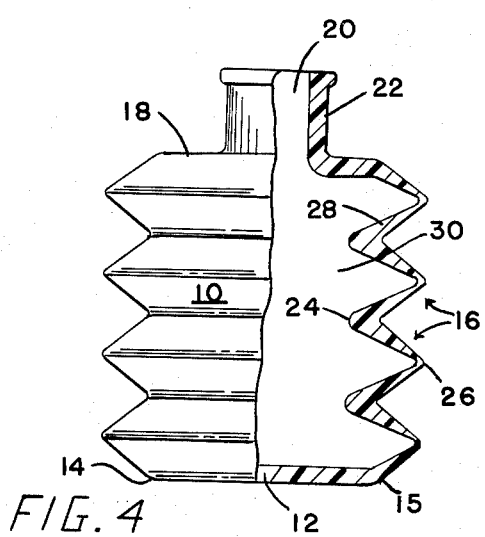

3,201,111
MULTI-PURPOSE, INHERENTLY BIASED, SELF-INFLATABLE BELLOWS
Leonard Afton, 4880 N. Marine Drive, Chicago, Ill.
Filed Nov. 12, 1963, Ser. No. 323,167
1 Claim. (Cl. 267—1)

The present invention relates generally to bellows and has particular reference to a multi-purpose, inherently biased, self-inflatable, plastic bellows which is capable of a wide variety of uses, and by reason of its inherent resiliency and the manner in which it is biased, has a tendency automatically to restore itself to its extended condition after compressional forces tending to collapse the same are relieved.

Bellows which are manufactured according to the principles of the present invention will find a wide variety of uses, among the more important of these being in the field of physical therapy and in the field of anatomical protection against shock. The particular use to which the bellows of the present invention may be put will determine the shape characteristics of the bellows and the size of the orifice opening therein. For example, it is contemplated that a bellows having an end face of abdominal size may be applied to the distal end of a golf cart handle in an appropriate manner and the golf cart then pushed along the golf course with one end thereof resting against the abdomen of the cart user, thus giving to the user, in connection with pushing of the cart, an abdominal massage as he or she travels along the golf course, the resistance to traction that is afforded by undulations on the course being transmitted through the handle and bellows to the abdomen. A bellows of a different shape and having an end face of appropriate size and shape may be employed as a seat in a motor vehicle, particularly a public transportation vehicle, such, for example, as a bus, to protect the user against road shocks. In the field of safety, a bellows that is constructed according to the present invention may be molded so as to accommodate the shape of a glove compartment, a sun visor, a horn ring, or other portion of the passenger compartment of a motor vehicle to protect the drive or passenger from injury in the case of an accident. A small-sized bellows in the form of a shoe sole and of small longitudinal extent may be employed by a parachutist to ease his landings. In the field of clothing, an appropriately shaped bellows, inherently biased according to the present invention, may serve as a shoulder pad for a football player, or as a knee guard. The bellows of the present invention may also be incorporated in the clothing of an invalid to protect him or her against falls. A workman in the field employing such an implement as a hoe or shovel may mount the bellows of the present invention on the proximate end of the handle of such implement to the end that the bellows will serve as a comfortable seat during idle periods. Irrespective, however, of the particular use to which the present invention may be put, the essential features thereof are at all times preserved.

The provision of a bellows of the character briefly outlined above being the principal object of the invention, it is a further object to provide a bellows which is of integral one-piece construction and, although being inherently biased to its fully extended condition, is devoid of springs, metal inserts or other extraneous instrumentalities which, in the event of sudden bellows collapse under compressional forces, might prove injurious to the user.

The provision of a bellows which is capable of being economically manufactured by a conventional injection molding process; one which after the molding operation requires no machining or further finishing operations, thereby further contributing to low cost of production;

one which is rugged and durable and, therefore, will withstand rough usage without damage; and one which is otherwise well-adapted to perform the services required of it, are further desirable features which have been borne in mind in the production and development of the present invention.

Other objects and advantages of the invention, not at this time enumerated, will become more readily apparent as the nature of the invention is better understood.

In the accompanying single sheet of drawings forming a part of this specification, one illustrative embodiment of the invention has been shown.

In this drawing:
FIG. 1 is a front elevational view, partly in section, of a bellows construction according to the present invention;
FIG. 2 is a top plan view of the bellows;
FIG. 3 is a bottom plan view of the bellows; and
FIG. 4 is a side elevational view, partly in section, of the bellows.

Referring now to the drawings in detail, the bellows that is illustrated therein is designated in its entirety by the reference numeral 10 and includes a substantially flat bottom wall 12 which is of generally crescent or half-moon shape and has a straight side edge 14 (see FIG. 3) and an arcuate edge 15. Rising from the bottom wall 12 are the bellows convolutions 16 of which there may be any desired number depending upon the height or longitudinal extent of the bellows as a whole. Four convolutions 16 are shown in the drawings by way of example only and not by way of limitation. The convolutions are continuous around the circumference of the bellows and conform in contour to the contour of the bottom wall 12. The convolutions terminate at and merge with a generally flat top wall 18. The latter is formed with a bellows orifice or aperture 20 which is afforded by an upstanding nipple 22 of circular cross section as best shown in FIG. 2.

The character of the individual convolutions 16 constitutes an important feature of the present invention. These convolutions are relatively thick at their bases as indicated at 24, while at their apices or outer peripheries they are relatively thin as indicated at 26. The sides 28 of the convolutions are outwardly tapered to produce this discrepancy in thicknesses. The convolution apices' peaks are relatively sharp, as also are the outside convolution valleys, but the convolution bases are relatively blunt.

The bellows 10 is formed of any suitable moldable plastic material, such as a thermoplastic or thermosetting phenol condensation product, there being a wide variety of materials available for the construction of the bellows. A plastic material must be selected which possesses an appreciable degree of resistance to compressional forces, yet which, when deformed, has a tendency automatically to restore itself to its original shape with a quick response. As shown in the drawings, the bellows is of one-piece construction and as a result, the various parts thereof are all integral.

In the manufacture of the bellows 10, the mold is designed so that the included angles between adjacent convolutions and within the individual convolutions are substantially equal and with the angles being on the order of 45° so that the bellows chamber 30 is of sufficient volume to allow a reasonable degree of diminution in the over-all length of the bellows when collapse thereof takes place. Obviously, when the bellows is subjected to endwise compressional forces tending to collapse it, the air within the bellows chamber 30 will be expelled gradually through the bellows aperture 20 at a rate commensurate with the size of such aperture. The size of the aperture 20 will, of course, vary with the particular design of the bellows and the use to which the bellows is to be put. The bellows 10 is shown in the drawings as being in its normal extended condition and the shape thereof in this condition is the exact shape in which it is molded.

In operation, compressional endwise forces tending to collapse the bellows are first reflected by a decrease in the peak angle of the various convolutions 16 with the base angle of each convolution remaining either constant or undergoing only a slight decrease. The convolutions thus fold upon themselves progressively until such time as appreciable resistance is offered by the convolution bases which then commence to decrease their respective included angles. This decrease in included base angles continues until such time as the bellows convolution walls go solid and the bellows is fully collapsed. In the normal use of the bellows, however, this solid condition of the bellows walls will seldom be encountered. Upon release of the compressional forces, the bellows will gradually resume its normal extended condition, its rate of restoration being dependent, of course, upon the size of the bellows aperture 20.

The invention is not to be limited to the exact bellows construction shown in the accompanying drawing or described in this specification as various changes in the details of construction may be resorted to without departing from the spirit or scope of the invention. Therefore, only insofar as the invention has particularly been pointed out in the accompanying claim is the same to be limited.

Having thus described the invention what I claim as new and desire to secure by Letters Patent is:

A one-piece molded plastic bellows formed of a resilient material which offers an appreciable degree of resistance to compressional forces and which possesses quickly physical restorative properties, said bellows including spaced end walls and intervening bellows convolutions, said end walls being relatively movable toward and away from each other between a position of wide separation wherein the bellows is extended and a position of close proximity wherein the bellows is collapsed, said bellows being inherently biased by the molecular disposition of the material of which it is formed to its extended condition, one of said end walls being formed with a bellows aperture therein, said bellows' convolutions being of zig-zag configuration in the longitudinal direction of the bellows so as to present thin outside apex regions having sharp exterior peaks and inside base regions having sharp outside valleys, said base regions inwardly of said valleys and internally of the bellows chamber presenting blunt apices, said base regions being dimensionally thick.

References Cited by the Examiner

UNITED STATES PATENTS

| | | | |
|---|---|---|---|
| 1,579,183 | 3/26 | Weiland | 267—35 X |
| 1,902,323 | 3/33 | Monge | 92—47 X |
| 2,898,941 | 8/59 | Kilcup | 138—121 |
| 2,988,848 | 6/61 | Lemelson | 92—34 X |

FOREIGN PATENTS 531,245   7/55   Italy.

ARTHUR L. LA POINT, *Primary Examiner.*